(12) United States Patent
LeCrone et al.

(10) Patent No.: US 10,509,707 B1
(45) Date of Patent: Dec. 17, 2019

(54) SELECTIVE DATA MIRRORING

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 15/379,862

(22) Filed: Dec. 15, 2016

(51) Int. Cl.
*G06F 7/00* (2006.01)
*G06F 11/20* (2006.01)
*G06F 16/25* (2019.01)
*G06F 16/27* (2019.01)

(52) U.S. Cl.
CPC ........ *G06F 11/2082* (2013.01); *G06F 16/258* (2019.01); *G06F 16/275* (2019.01)

(58) Field of Classification Search
CPC ........... G06F 11/2082; G06F 17/30581; G06F 17/30569; G06F 11/1662; G06F 11/2056; G06F 2201/855; G06F 2212/286
USPC ......... 707/657, 655, 656, 658, 660, 999.204
See application file for complete search history.

(56) References Cited

U.S. PATENT DOCUMENTS

| | | | | |
|---|---|---|---|---|
| 5,581,743 A | * | 12/1996 | Burton | G06F 3/0601 703/26 |
| 5,742,792 A | * | 4/1998 | Yanai | G06F 3/0601 710/1 |
| 6,304,940 B1 | * | 10/2001 | Beardsley | G06F 3/061 711/112 |
| 6,823,349 B1 | * | 11/2004 | Taylor | G06F 11/2082 |
| 6,954,835 B1 | * | 10/2005 | Lecrone | G06F 11/2071 707/999.202 |
| 6,986,009 B1 | | 1/2006 | LeCrone et al. | |
| 7,076,690 B1 | * | 7/2006 | Todd | G06F 3/0617 714/13 |
| 7,093,088 B1 | * | 8/2006 | Todd | G06F 11/1415 707/999.202 |
| 7,437,523 B1 | * | 10/2008 | Ting | G06F 17/30067 711/161 |
| 7,478,101 B1 | * | 1/2009 | Manley | G06F 11/1451 |
| 7,707,186 B2 | | 4/2010 | LeCrone et al. | |
| 10,001,927 B1 | * | 6/2018 | Trachtman | G06F 3/061 |

(Continued)

*Primary Examiner* — Mohammed R Uddin
(74) *Attorney, Agent, or Firm* — Muirhead and Saturnelli, LLC

(57) ABSTRACT

Described are techniques for mirroring data that may include issuing, by an application on a host, a write operation that writes first data to a primary storage entity having data stored in accordance with a first format and first structure; intercepting, on the host, the write operation; and performing, on the host, first processing to process the write operation. The first processing may include: sending the write operation to a data storage system including the primary storage entity; determining whether the primary storage entity is mirrored as a second storage entity having data stored in a second format and second structure different from the first format and first structure; and responsive to determining the primary storage entity is mirrored as the second storage entity, issuing one or more second write operations to mirror the first data on the second storage entity in accordance with the second format and second structure.

20 Claims, 9 Drawing Sheets

(56) References Cited

U.S. PATENT DOCUMENTS

| | | | |
|---|---|---|---|
| 2003/0088713 A1* | 5/2003 | Mandal | G06F 9/5016 |
| | | | 719/328 |
| 2003/0217119 A1* | 11/2003 | Raman | H04L 67/1095 |
| | | | 709/219 |
| 2004/0078630 A1* | 4/2004 | Niles | G06F 3/0623 |
| | | | 714/5.11 |
| 2004/0205312 A1* | 10/2004 | Zlotnick | G06F 11/2069 |
| | | | 711/162 |
| 2005/0066118 A1* | 3/2005 | Perry | G06F 11/1469 |
| | | | 711/112 |
| 2005/0114465 A1* | 5/2005 | Coronado | G06F 3/0622 |
| | | | 709/214 |
| 2006/0010227 A1* | 1/2006 | Atluri | G06F 11/1453 |
| | | | 709/217 |
| 2008/0120482 A1* | 5/2008 | Jarvis | G06F 11/2069 |
| | | | 711/162 |
| 2008/0301334 A1* | 12/2008 | Ishii | G06F 3/0605 |
| | | | 710/52 |
| 2011/0093862 A1* | 4/2011 | Doatmas | G06F 3/0617 |
| | | | 718/105 |

* cited by examiner

| Host Write I/O ID 402 | R1 write status 401 | R2 Write I/O 404 | R2 Write Status 406 |
|---|---|---|---|
| A | Complete | A1<br>A2 | Pending<br>Complete |
| B | Pending | B1 | Complete |
| .. | .. | .. | |

407a → (row A), 407b → (row B)

SELECTIVE DATA MIRRORING

BACKGROUND

Technical Field

This application generally relates to data storage and more particularly to techniques used in connection with data mirroring.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like.

SUMMARY OF THE INVENTION

In accordance with one aspect of techniques herein is a method of mirroring data comprising: issuing, by an application on a host, a write operation that writes first data to a primary storage entity, said primary storage entity having data stored in accordance with a first format and first structure; intercepting, on the host, the write operation; and performing, on the host, first processing to process the write operation comprising: sending the write operation from the host to a data storage system including the primary storage entity; determining whether the primary storage entity is mirrored as a second storage entity having data stored in a second format and second structure different from the first format and first structure; and responsive to determining the primary storage entity is mirrored as the second storage entity, issuing one or more second write operations to mirror the first data on the second storage entity in accordance with the second format and second structure. The first processing may include processing the first data to store the first data on the second storage entity in accordance with the second format and second structure without modifying the first data. The first processing may include partitioning the first data into multiple portions; and determining first metadata describing a representation of the first data as the multiple portions, wherein the one or more second write operations write the first metadata and the multiple portions to the second storage entity. The first processing may include transforming the first data to second data in accordance with the second format and second structure, wherein the second data includes a modified form of the first data, wherein the one or more second write operations write the second data to the second storage entity and also writes any second metadata, to the second storage entity, wherein the second metadata describes the second data in accordance with the second format and second structure. The transforming may include performing any one or more of: removing at least some of the first data, replacing a first portion of the first data with different data, adding additional data to the first data. The primary storage entity and second storage entity may be in a same data storage system. The first processing may be performed by an I/O driver on the host. The method may include performing processing that initially synchronizes the primary storage entity and the second storage entity prior to processing the write operation. The primary storage entity may be a first file on a first logical device, and the second storage entity may be a second file on a second logical device, wherein data may be stored on the first logical device in accordance with the first format and the first structure and data may be stored on the second logical device in accordance with the second format and the second structure. The primary storage entity may be a first logical device and the second storage entity may be a second logical device, wherein data may be stored on the first logical device in accordance with the first format and the first structure and data may be stored on the second logical device in accordance with the second format and the second structure. The primary storage entity may be a portion of a first device and the second storage entity may be a portion of a second device. The first processing may write the first data to the primary storage entity and may mirror the first data on the second storage entity in a synchronous manner whereby an acknowledgement regarding completion of the write operation may be returned to the application when the host receives acknowledgement that the first data has been written to the first storage entity and also receives acknowledgement that the first data has been mirrored to the second storage entity. The first processing may write the first data to the primary storage entity and may mirror the first data on the second storage entity in an asynchronous manner whereby an acknowledgement regarding completion of the write operation may be returned to the application when the host receives acknowledgement that the first data has been written to the first storage entity without further requiring acknowledgement that the first data has been mirrored to the second storage entity.

In accordance with another aspect of techniques herein is a system comprising: at least one processor; and a memory comprising code stored thereon that, when executed, performs a method of mirroring data comprising: issuing, by an application on a host, a write operation that writes first data to a primary storage entity, said primary storage entity having data stored in accordance with a first format and first structure; intercepting, on the host, the write operation; and performing, on the host, first processing to process the write operation comprising: sending the write operation from the host to a data storage system including the primary storage entity; determining whether the primary storage entity is mirrored as a second storage entity having data stored in a second format and second structure different from the first format and first structure; and responsive to determining the primary storage entity is mirrored as the second storage entity, issuing one or more second write operations to mirror the first data on the second storage entity in accordance with the second format and second structure.

In accordance with another aspect of techniques herein is a computer readable medium comprising code stored thereon that, when executed, performs a method of mirroring data comprising: issuing, by an application on a host, a write operation that writes first data to a primary storage entity, said primary storage entity having data stored in accordance with a first format and first structure; intercepting, on the host, the write operation; performing, on the host, first processing to process the write operation comprising: sending the write operation from the host to a data storage system including the primary storage entity; determining whether the primary storage entity is mirrored as a second storage entity having data stored in a second format and second structure different from the first format and first structure; and responsive to determining the primary storage entity is mirrored as the second storage entity, issuing one or more second write operations to mirror the first data on the second storage entity in accordance with the second format and second structure. The first processing may include processing the first data to store the first data on the second storage entity in accordance with the second format and second structure without modifying the first data. The first processing may include partitioning the first data into multiple portions; and determining first metadata describing a representation of the first data as the multiple portions, wherein the one or more second write operations write the first metadata and the multiple portions to the second storage entity. The first processing may include transforming the first data to second data in accordance with the second format and second structure, wherein the second data may include a modified form of the first data, wherein the one or more second write operations may write the second data to the second storage entity and may also write any second metadata, to the second storage entity, wherein the second metadata may describe the second data in accordance with the second format and second structure. Transforming may include performing any one or more of: removing at least some of the first data, replacing a first portion of the first data with different data, adding additional data to the first data. The first processing may be performed by an I/O driver on the host.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example of information that may be used by an I/O driver in an embodiment in accordance with techniques herein;

FIG. 8 is a flowchart of processing steps that may be performed in an embodiment in accordance with techniques herein.

DETAILED DESCRIPTION OF EMBODIMENT(S)

Figure 1:
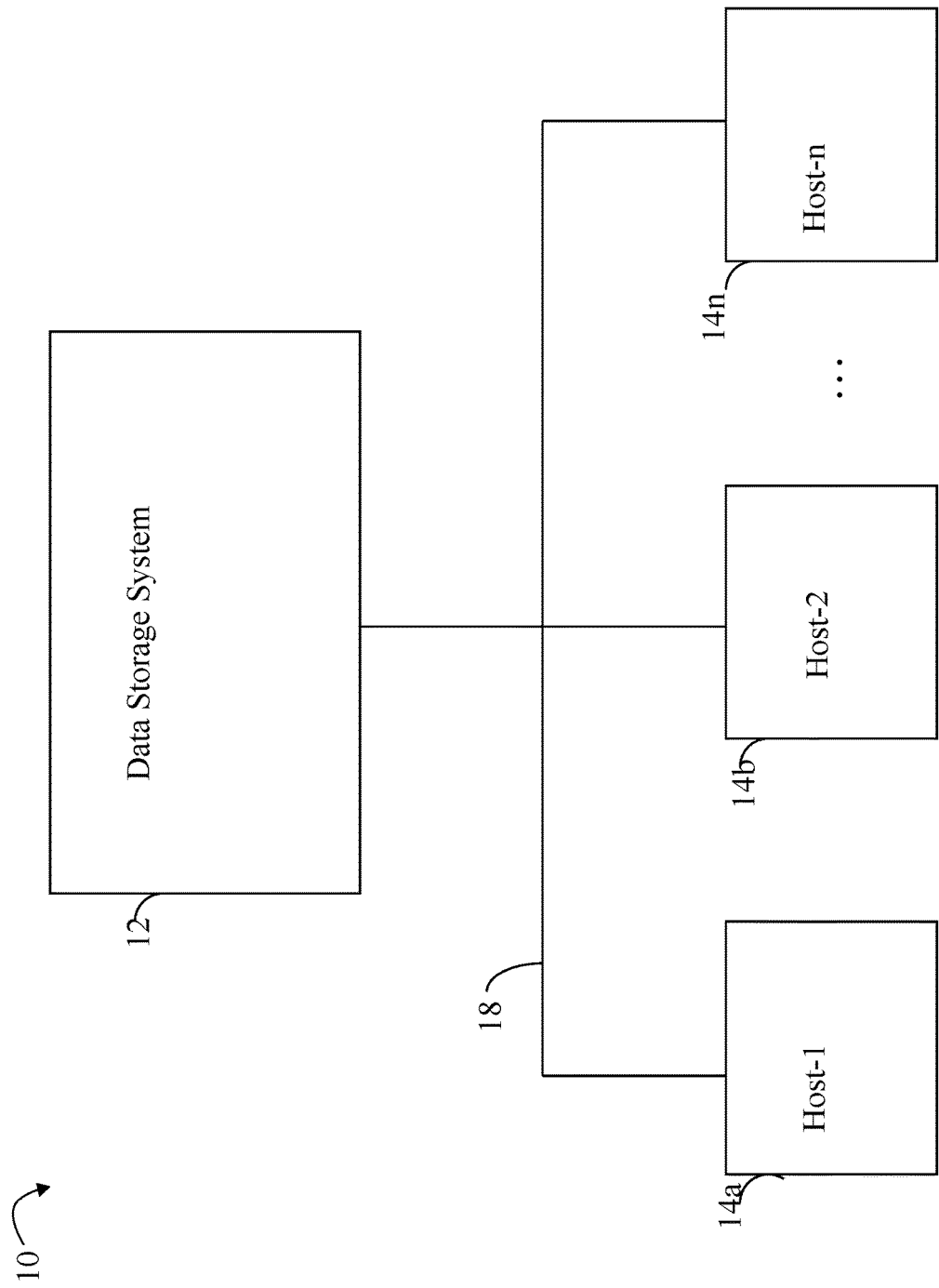
FIGS. 1, 3, 4 and 8 are examples of embodiments of systems and components that may utilize the techniques described herein.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
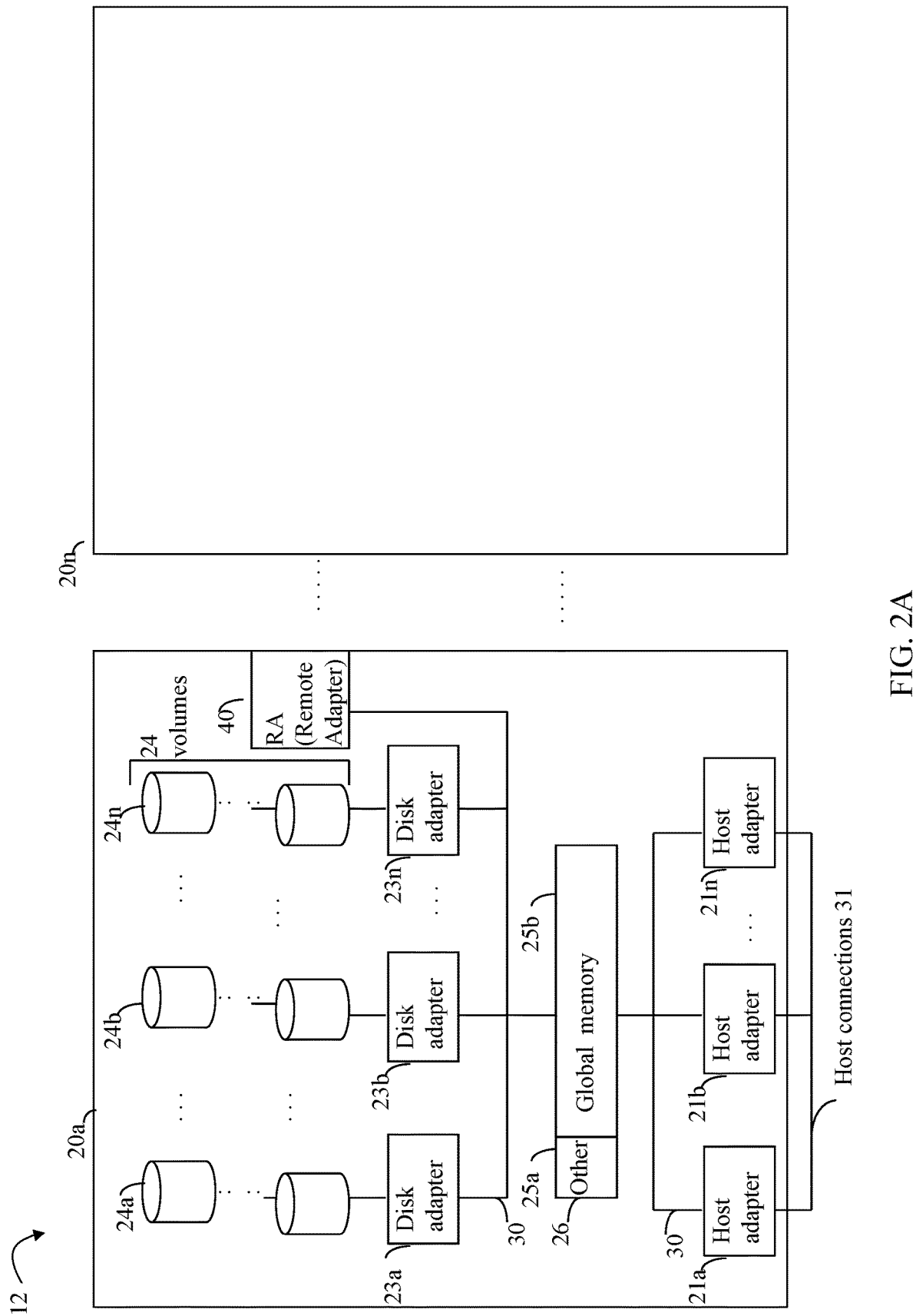
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment, the RAs of the different data storage systems may communicate over Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

Figure 2B:
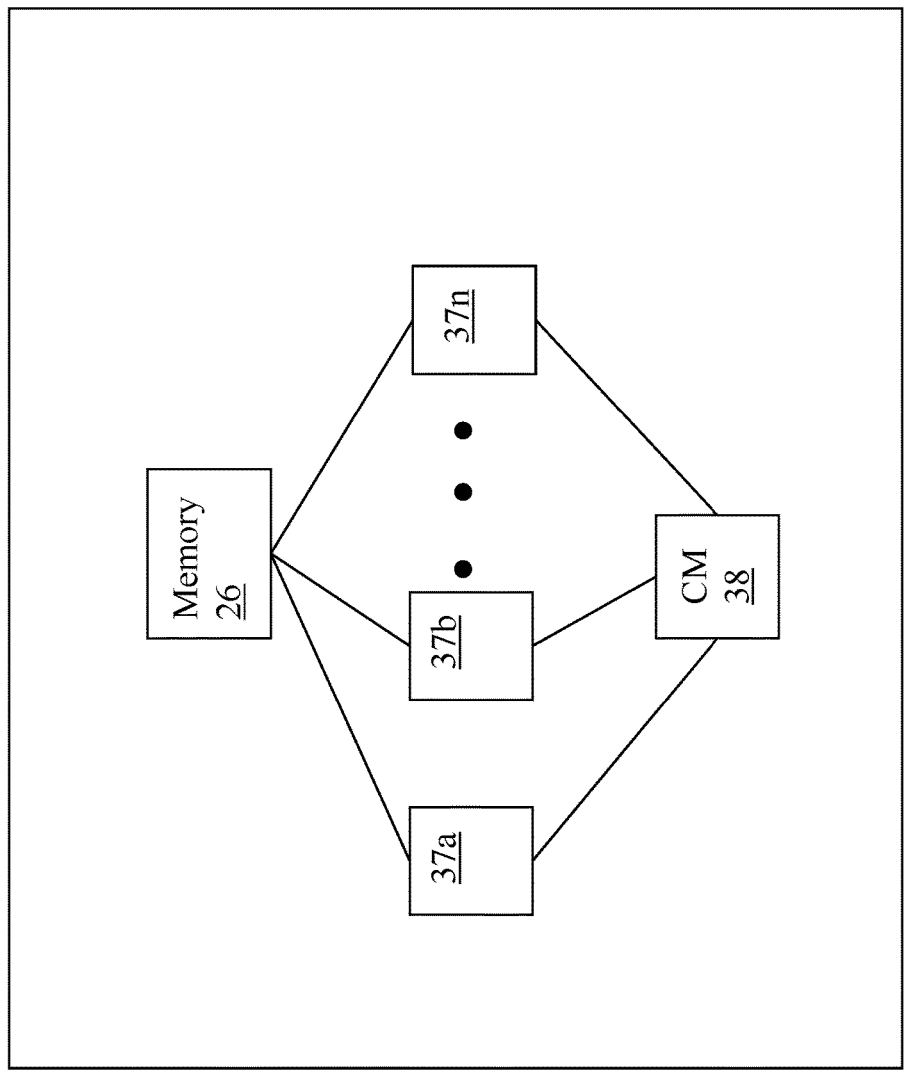
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
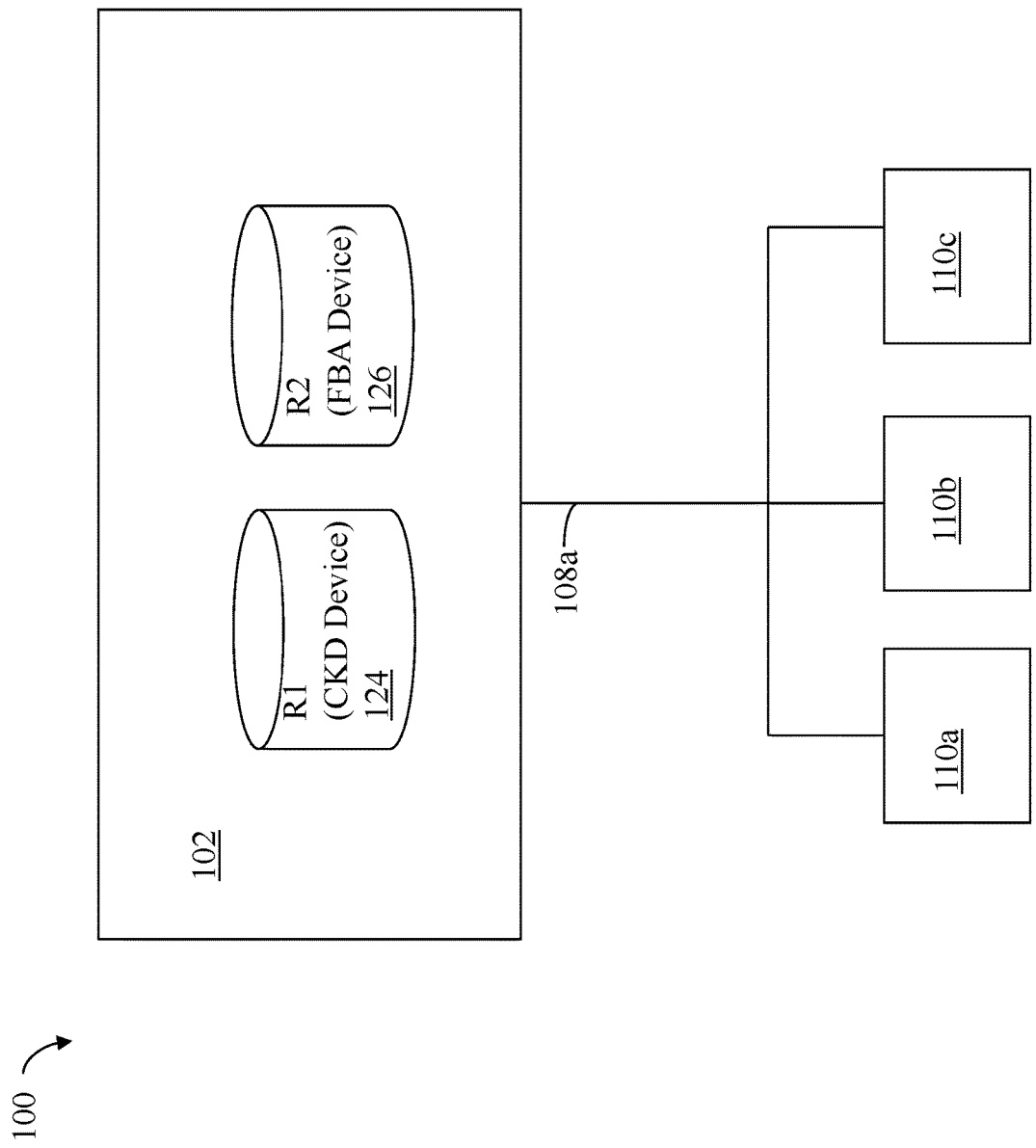

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 is data storage system 102, and hosts 110a, 110b and 110c. The data storage system 102 may be similar to the data storage system 12 described above, and hosts 110a-c may be similar to hosts 14a-n described above. Element 108a may be similar to 18 of FIG. 1 as described above. Hosts 110a, 110b and 110c may perform operations to data storage system 102 over connection 108a. The hosts 110a, 110b and 110c may be connected to the data storage system 102 through connection 108a which may be, for example, network or other type of communication connection.

The data storage system 102 may include one or more logical devices. In this example, data storage system 102 includes logical device R1 124 and logical device R2 126. The data storage system 102 may include one or more other logical and/or physical devices. Each of the hosts 110a-110c may access logical device R1 124 and/or logical device R2 126 over connection 108a. It should be noted that in at least one embodiment as illustrated in FIG. 3, both the logical device R1 124 and logical device R2 126 may be in the same data storage system. However, the foregoing is not required and techniques herein may be used in connection with other embodiments, for example, such as where the logical device R1 124 and logical device R2 126 are each in a different data storage system.

In at least one embodiment, logical device R1 124 may have a first data layout, format and structure; and the logical device R2 126 may have a second data layout, format and structure different than that of logical device R1 124.

In at least one embodiment, the logical device R1 124 may have a data layout based on the CKD (count key data) architecture and format, and one or more of the hosts 110a-c may access data of device R1 124 using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to devices in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

In at least one embodiment, a host, such as host 110a, may have an architecture based on IBM Corporation's System z architecture and computing environment. System z components, such as the hosts 110a-b, may operate with IBM's z/OS (operating system) and/or other zSeries operating systems. Input/Output (I/O) devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels. For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, *z/Architecture: Principles of Operation*, IBM, SA22-7832-04, 2005 for a detailed z/Architecture description. In at least one embodiment, the hosts 110a may be an IBM z series mainframe computing system running a version of the z/OS operating system. In such an embodiment, the host 110a may use a FICON connection to access data of logical device R1 124 having the CKD data format. For example, the host 110*a* may issue a command, such as to read data from and/or write data to logical device R1 of data storage system 102. In one aspect, the CKD architecture and FICON connection (and associated standards or protocols) may be characterized as native with respect to host 110*a* and its computing environment (e.g., hardware and/or software). For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

In contrast to the CKD architecture is a fixed block architecture (FBA). In at least one embodiment, the logical device R2 126 may have a data format, layout and structure based on the FBA. FBA may be characterized as another storage device data architecture where the data of the storage device is mapped over fixed size blocks or sectors. With the FBA architecture, the location of any block can be calculated to retrieve that block. This architecture uses tracks and cylinders. A physical disk contains multiple blocks per track, and a cylinder is the group of tracks that exists under the disk heads at one point in time without performing a seek operation. Thus, a device with FBA has a data layout in which each addressable record, such as a block, on disk is of the same size such as providing for logical block addressing (LBA). The FBA architecture may be used with different connectivity or attachment methodologies and standards than those used in connection with the CKD architecture. For example, the FBA may be an architecture supported and utilized by host 110*b* when accessing devices over a SCSI/FC connection rather than a FICON connection. The SCSI/FC connection and FBA architecture may be used, for example, with a computer system such as host 110*b* running a UNIX or LINUX-based operating system (e.g., operating system other than the z/OS or MVS operating system) and which may further include a different underlying hardware architecture than System z (e.g., such as host 110*a* described above). For example, host 110*b* may include hardware based on an Intel-based architecture such as an x86 architecture. (The term x86 may refer to a family of instruction set architectures based on the Intel 8086 CPU). Thus, the FBA architecture and connection methodologies (protocol or standard such as over a SCSI/FC connection) used to access storage devices in accordance with the FBA architecture may be characterized as native with respect to host 110*b*. In other words, in one aspect, the FBA architecture and connection methodologies (protocol or standard such as over a SCSI/FC connection) used to access storage devices in accordance with the FBA architecture may be characterized as native with respect to host 110*b* having a different computing environment (e.g., hardware and/or software) than the host 110*a* as described above. For example, the FBA architecture and connection methodologies (protocol or standard such as over a SCSI/FC connection) used to access storage devices in accordance with the FBA architecture may be characterized as native with respect to a host 110*b* running, for example, the LINUX or UNIX-based operating system and/or having the x86 architecture. In contrast, the CKD architecture and FICON connection (and associated standards or protocols) may be characterized as native with respect to host 110*a* (and its computing environment) and non-native with respect to host 110*b* (and its computing environment) (e.g., the CKD architecture and FICON standard/connection may be non-native with respect to host 110*b* running, for example, the LINUX or UNIX-based operating system and/or having the x86 architecture).

Furthermore, in a similar manner, the FBA and SCSI/FC connection (and associated standards or protocols) may be characterized as native with respect to host 110*b* (and its computing environment) and non-native with respect to host 110*a* (and its computing environment) (e.g., the FBA and SCSI/FC connection (and associated standards or protocols) may be characterized as non-native with respect to host 110*a* running, for example, an IBM-based operating system such as the z/OS or MVS and/or having the System z hardware architecture including the hardware-based I/O subsystem).

Data storage system 102 may be a Symmetrix® data storage system, provided by EMC Corporation of Hopkinton, Mass., which is a data storage system compatible with both the logical device R1 124 and logical device R2 126, and associated protocols (e.g., FICON, SCSI/FC), storage device architectures, layouts, structures (e.g., FBA and CKD). In at least one embodiment, the host 110*a* may be able to access both R1 124 and R2 126. In at least one embodiment, the host 110*a* running the z/OS may be able to access R2 126 using FICON/FBA. However, in such an embodiment, the host 110*b* may only access R2 126 but not R1 124.

In some instances, it may be desirable to mirror R1 124, or selected portions thereof, in real time to R2 126 so that host 110*b* may be provided with real time access to such mirrored data portions through the host 110*b* accessing R2 126. In this manner, host 110*b* may have access to the mirrored data portions placed on R2 126 in real time as the host 110*a* performs writes to R1 124. Described in following paragraphs are techniques that may be used to perform such mirroring of R1 124, or selected portions thereof, in real time to R2 126. In following paragraphs, reference is made to an embodiment in which one or more files on R1 124 are the selected portions of R1 124, the CKD device, mirrored on R2 126, the FBA device. However, more generally, such techniques may be performed with respect to mirroring any storage entity or granularity, such as an entire logical device or other selected logical device portions. Additionally, although R1 124 is the primary storage device having the CKD architecture, data layout, structure and format; and R2 126 is the second or mirrored storage device having the FBA architecture, structure and layout; more generally, such techniques described herein may be used in embodiments where R1 124 has a first format, structure and layout, and R2 has a second format, structure and layout different from that of R1 124.

In accordance with techniques herein as described in following paragraphs, the host 110*a* may issue a command, such as to write first data to a file stored on logical device R1 124 of data storage system 102. The file may be one of the particular files selected for mirroring on logical device R2 126. In accordance with techniques herein, processing may be performed on the host 110*a* to issue the write operation writing first data to R1 124. Additionally, processing on the host 110*a* may also issue one or more second write operations to write the first data of the write to the mirror of the file as stored on R2 126. In at least one embodiment, the one or more second write operations to the file mirror on R2 126 may be issued in parallel (or at least partially overlap with) the write operation to R1 124.

In at least one embodiment, the first data may be written to the file mirror on R2 126 whereby the first data, as stored on R2, is physically mirrored and preserved without modification. In other words, with physical mirroring, the first data is not modified in connection with the one or more second write operations. In connection with physical mirroring in one embodiment where R1 124 is in accordance with the CKD architecture and R2 126 is in accordance with the FBA architecture, the first data may be written by performing a write I/O in accordance with the CKD file/architecture such as a write in units such as records. Each record of the CKD file may be, for example, 4K bytes. An FBA file, or more generally, mirrored data stored on the FBA device R2 126 may have a fixed block size of 512 bytes. In this manner, the unit of granularity of the CKD file and device R1 may be a record and the unit of granularity of the FBA file and device R2 may be 512 bytes. With physical mirroring, the host 110*a* may write a single record to the CKD file on R1 using a first write operation and then issue, generally, one or more second I/O operations to write the first data to the mirrored FBA file on R2. The physical mirroring may include partitioning the single record or first data of the CKD file into multiple portions or units which are blocks (the granularity used for the FBA device). In this example where the first data written is a single 4K CKD record, the single 4K CKD record of the CKD file may be divided into 8 portions, where each of the 8 portions is a different block or 512 byte portion of the 4K record. The host 110*a* may issue one or more second write operations to write the 8 512 byte block portions to the CKD data to the mirror on the FBA device R2. Additionally, processing in accordance with techniques herein may embed additional metadata on allocated storage of the R2 mirror describing the format of the mirrored first data (e.g., the mapping of the single CKD record to the 8 portions/blocks of CKD data mirrored on R2). In at least one embodiment, such metadata may be stored on the FBA device immediately prior to where the mirrored CKD is written on the FBA device (e.g., metadata stored immediately prior to the logical location on the FBA device where the 8 portions of the first data is stored). For example, for CKD data file may have its data mirrored on R2. Prior to storage allocated on R2 FBA device for the mirror, an additional metadata portion may be stored describing the format of the subsequently mirrored CKD data such as describing the mapping between a particular group of 8 FBA blocks and corresponding single record of CKD file data. Thus, writing to the mirror of a CKD file stored on R2 may also include updating or modifying such additional metadata.

As a variation to physically mirroring the first data on R2 126, an embodiment may performing processing to logically mirror the first data on R2 126 whereby the first data may be modified or transformed and then stored in this modified or transformed version on R2 126. In connection with logical mirroring involving transforming the first data, the first data, as stored in the file mirror on R2, is not guaranteed to be preserved. In other words, with logical mirroring, the second one or more write operations (that mirror the first data on R2) may write a modified version or form of the first data (e.g., in modified version or form, some of the first data (as stored on R1) may be removed, or modified, or additional data may be added to the first data). For example, the transformation such as performed by host 110*a* may include transforming CKD data (the first data of the write operation) to generate a modified version where the underlying CKD data (first data) has been modified and is not preserved. The modified version of the CKD data may be stored to the file mirror on R2 in accordance with the FBA whereby the original CKD data (original form of the first data) is not preserved. In one aspect, the physical mirroring may be characterized as remapping the original first data, the CKD data, without modification. The logical mirroring (in contrast with physical mirroring) may be characterized as transforming the CKD data where the CKD data stored on R2 is not guaranteed to be preserved (e.g., may be modified by transformation process).

As just described, in at least one embodiment, the modified version of the CKD data on R2 may be stored in the FBA format, layout and structure. More generally, the modified version of the CKD data as stored on R2 may be in accordance with any suitable structure, layout and format expected by the one or more applications that use such R2 data having the modified version of the CKD data. For example, one or more hosts may expect and use the R2 data accordance with a different layout, structure and format such as that of a data base management system (DBMS) on such hosts that accesses the R2 data. In this latter embodiment, the CKD data may be transformed into a DBMS format used by the DBMS application such that the DBMS is unaware of the fact that the R2 data is actually a transformed or modified version of the R1 original data having the CKD layout, format and structure.

In an embodiment in accordance with techniques herein, a user or customer may select one or more CKD files stored on the CKD device, R1 124, to be mirrored in real time to the FBA device, R2 126. Space may be allocated on the FBA device R2 to serve as the mirror of the selected one or more CKD files. In accordance with physical mirroring as described above and elsewhere herein, additional metadata may be embedded at the start of the FBA allocated space on R2 describing the format of the subsequent CKD data mirrored along with other control information. In at least one embodiment, the additional metadata for each file stored on R2 may precede the stored mirrored CKD data for the file as stored on R2. In this manner, a host, such as host 110*b* may have knowledge regarding the expected metadata (stored on R2 prior to the stored first data). The host 110*b* may read and interpret the metadata that describes the layout or structure of the following mirrored CKD data. For example, continuing with the example above where a single 4K byte record of CKD data is stored as 8-512 byte blocks, the metadata may indicate the mapping between the 8, 512 byte blocks comprising the single CKD record. In a similar manner, other metadata may denote the mapping or correspondence between the particular FBA blocks comprising each CKD record of mirrored data stored on R2. Thus, using such additional metadata, the host 110*b* may be able to interpret and read the subsequent CKD data mirrored on the FBA device R2.

In accordance with techniques herein, host 110*a* writing data to a file of the CKD device, R1 124, selected for mirroring will also mirror the write data to the mirrored file on the FBA device, R2 126. The foregoing mirroring may be performed responsive to any/all writes performed to the CKD version of the file stored on R1 124. In accordance with techniques herein, such writes to the CKD device and FBA device (to mirror the write data) may be performed in parallel by the host 110*a*. In at least one embodiment, the foregoing first write to the CKD device and the corresponding mirroring write to the FBA device may be performed in a synchronous manner whereby the application on host 110*a* issuing the write to the CKD file does not receive a completion for the write I/O until host 110*a* receives acknowledgment from the data storage system 102 that both the first write to R1 124 and the corresponding mirroring write(s) to the file mirror on R2 126 have completed. As a variation, the foregoing first write to the CKD device and the corresponding mirroring write to the file mirror on the FBA device may be performed in an asynchronous manner, whereby the application on host 110*a* issuing the write to the CKD file receives a completion for the write I/O until host 110a so long as at least the first write to the CKD file on R1 124 has completed (e.g., do not have to wait for acknowledgement that the corresponding mirroring write(s) to R2 126 has completed). In the latter asynchronous case, the FBA mirror on R2 126 denotes a point in time version of the mirrored file prior to the more current version of the file as stored on the CKD device R1 124.

As a starting point, prior to the host 110a issuing the mirroring writes to R2 126, processing may be performed to initially copy the CKD file selected for mirroring to its FBA mirror allocation on R2 126. Thus, such processing may generally provide for synchronizing R1 124 and R2 126 with respect to the one or more selected files to be mirrored so that both R1 124 and R2 126 include a same copy of the selected one or more files. In connection with such synchronization processing, any needed data transformation may also be performed if the CKD file is being logically mirrored. Such synchronization processing may also include determining and storing with the CKD file mirror on R2 any required additional metadata. Subsequently, as described above and elsewhere herein, processing may be performed in an ongoing manner whereby all writes to the selected CKD files as stored on R1 are mirrored to corresponding FBA counterparts on R2 126.

In such a manner using techniques herein, a CKD file of R1 may be mirrored on FBA device R2 in real time in an ongoing manner. In such an embodiment, the host such as host 110b noted above may have real time access to updates of the mirrored CKD file as stored on the FBA device R2. Additionally, in the event the primary storage device, the CKD device 124, fails or is otherwise unavailable to the host 110a, an embodiment may have the host 110a use the FBA device 126 as the primary data copy so that all read and writes to the mirrored file (from host 110a) may be services using the mirrored copy of the file as stored on the FBA device 126.

Figure 4:
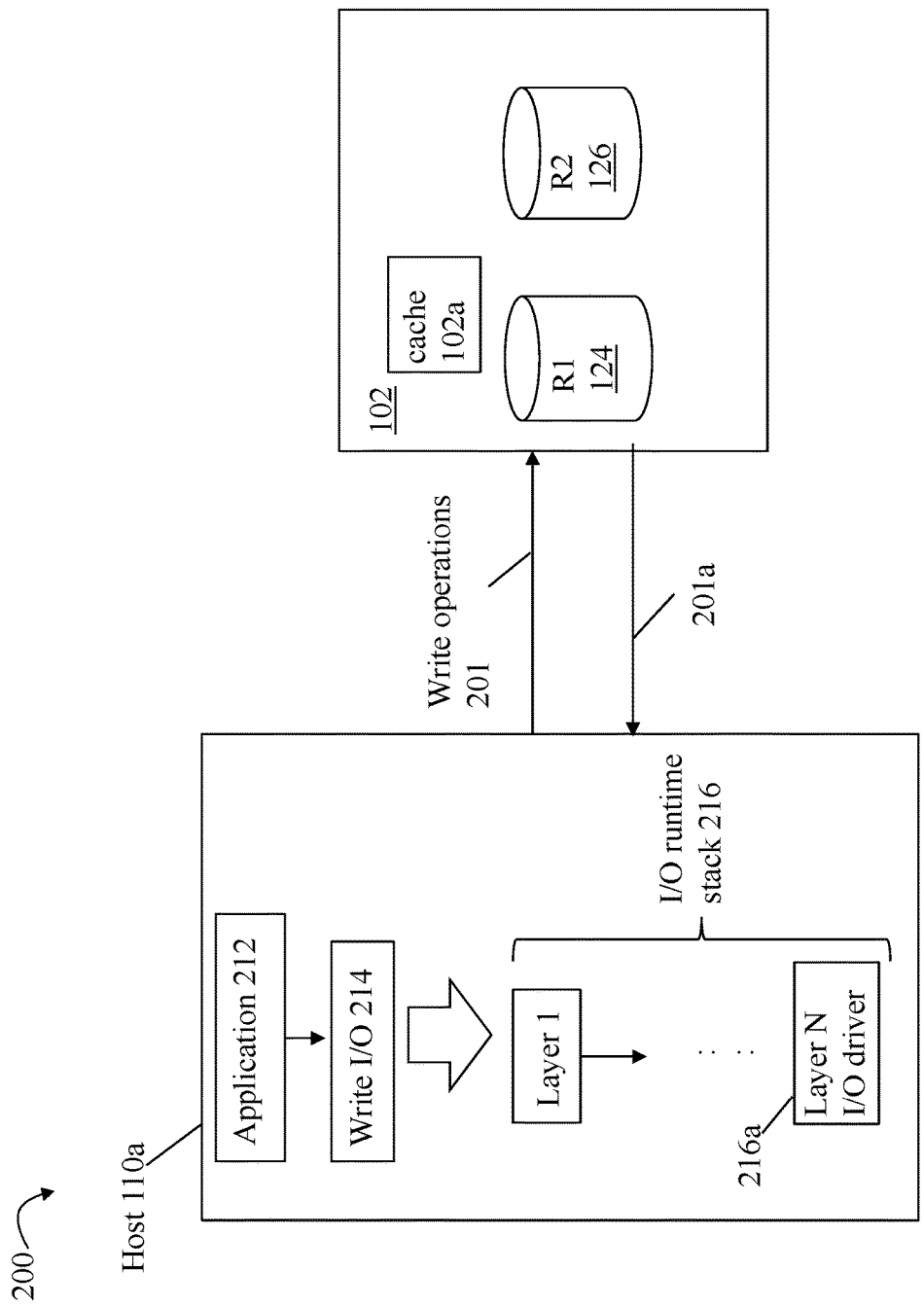

Referring to FIG. 4, shown is an example illustrating components and processing that may be performed in an embodiment in accordance with techniques herein. The example 200 includes host 110a, data storage system 102, and logical device R1 124 and R2 126, as described above. The host 110a may include application 212 executing thereon which may issue a write I/O operation 214, such as a write to a first CKD file stored in R1 124 for mirroring on R2 126.

The write I/O 214 may result in execution of a sequence of runtime calls or invocations of the I/O path on the host as denoted by the I/O runtime stack 216. Generally, the I/O runtime stack 216 may be characterized as a sequence of layered calls performed to process the write operation 214. Layer 1 may denote the highest layer of the stack 216 and layer N may denote the bottom or lowest layer in the stack 216. As known in the art, the stack 216 may include, for example, a logical volume manager, one or more I/O drivers, and the like. For example, if the write 214 writes user data to a location in a user data file, the stack 216 may include one or more layers that map the particular file location of the user data file to a host side logical device and associated logical device location. Additionally, the stack 216 may include an I/O driver 216a which may be characterized as a low level I/O driver that, for example, forms I/O command blocks sent to the system 102 and also receives responses from the system 102 in accordance with the particular protocols supported in an embodiment. Thus, as part of processing performed by one or more layers of the I/O runtime stack 216, the write to the first CKD file may be mapped into a corresponding modification of data stored at a target location or offset on the logical device R1 where the first CKD file is stored.

In at least one embodiment in accordance with techniques herein, the I/O driver 216a may perform processing providing for selective mirroring of portions, such as selected CKD files, of the R1 logical device 124 to the R2 logical device 126. Thus, on a per write I/O basis, the I/O driver 216a may decide whether the write is directed to a file or other portion of the R1 device 124 for which mirroring to R2 is to be performed. Responsive to determining the first write (as sent by the application 212) is directed to a CKD file on R1 where the CKD file is mirrored on R2, the I/O driver 126 may issue additional one or more second writes to the R2 FBA device to also write the first write to CKD file mirror on R2.

Both the first write to R1 124 and the one or more corresponding second writes to R2 126 may be sent 201 from the host 210 to the data storage system 102. The data storage system 102 may store the write data of such write operations (directed to both R1 and R2) to cache 102a of the data storage system 102. Consistent with other discussion herein, the cached write data for writes direct to R1 124 may be later destaged to physical non-volatile storage provisioned for the R1 logical device 124. Similarly, the cached write data for writes direct to R2 126 may be later destaged to physical non-volatile storage provisioned for the R2 logical device 126. The data storage system 102 may return an acknowledgement to host 110a regarding completion of a write to R1 124 once such write data is stored in cache 102a. The data storage system 102 may return an acknowledgement to host 110a regarding completion of a write to R2 126 once such write data is stored in cache 102a.

In at least one embodiment where synchronous mirroring between R1 124 and R2 126 is performed, an acknowledgement regarding completion of the host write I/O 214 may be returned to the application 212 only after host 110a receives acknowledgements from data storage system 102 that both the write to R1 124 and the one or more corresponding second writes to the mirror on R2 126 have completed. In at least one embodiment where asynchronous mirroring between R1 124 and R2 126 is performed, an acknowledgement regarding completion of the host write I/O 214 may be returned to the application 212 once the host 110a receives acknowledgement regarding completion of the write to R1 124 (e.g., does not require that the host 110a receives acknowledgement from system 101 regarding completion of the one or more corresponding second writes to the mirror on R2 126).

Figure 5:
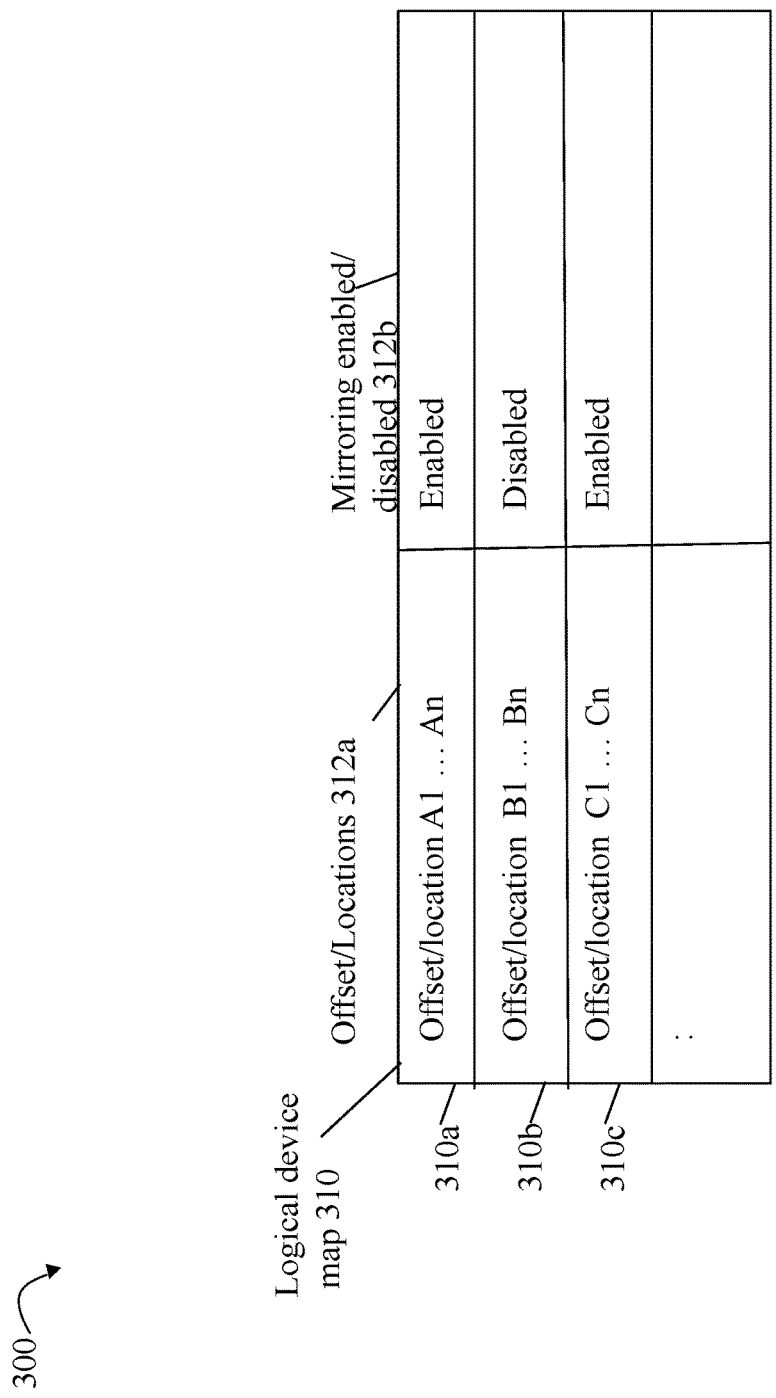
FIG. 5 is an example of a logical device map that may be used in an embodiment in accordance with techniques herein.

Referring to FIG. 5, shown is an example 300 of mapping information that may be used by the host I/O driver in an embodiment in accordance with techniques herein. The example 300 illustrates a logical device map 310 that indicates for different offsets or locations 312a of the logical device R1 whether mirroring is enabled or disabled 312b for each specified sequence of offsets or locations.

A different logical device map 310 may be maintained on the host 110a for each R1 logical device stored on data storage system 102 for which one or more files, or portions thereof, may be selected for mirroring on R2 126. Each row of 310 denotes a sequence of one or more contiguous logical device offsets or locations of R1 (in column 312a) and indicates (in column 312b) for the sequence whether mirroring on R2 is currently enabled or disabled. Column 312a may include offsets denoting a file or data portion of R1 that has a corresponding mirror on R2. If a particular row of 310 indicates a file/data portion with mirroring enabled in column 312b, column 312a of that particular row may identify both the file/data portion locations on R1 and also the location(s) on R2 of the file or data portion's corresponding mirror. For example, row 310a indicates that, for offset or locations A1 through An of the R1 logical device 124, mirroring to R2 126 of the data storage system 104 is enabled (whereby 312a also identifies the location(s) of the R2 mirror); row 310b indicates that, for offset or locations B1 through Bn of the R1 logical device 124, mirroring to R2 126 of the data storage system 104 is disabled; and row 310c indicates that, for offset or locations C1 through Cn of the R1 logical device 124, mirroring to R2 126 of the data storage system 104 is enabled (whereby 312a also identifies the location(s) of the R2 mirror). In at least one embodiment where a user may select one or more CKD files stored on R1 124 for mirroring on FBA device R2, each row of 310 may denote offsets or location on R1 corresponding to a single file or extent of a file that has a corresponding mirror on R2.

The I/O driver may receive a write operation from the host application where the write operation is directed to the logical device R1 on system 102 and use information in the logical device's map 310 to determine whether to mirror the write on R2 by issuing one or more additional I/O operations to the file or data portion's mirror stored on R2. It should be noted that generally, the original write to R1 may result in one or more writes to the mirror on R2. Such one or more additional writes to R2 may include writing the data (in its original or a modified form) to R2 along with any additional metadata, or updates to such metadata, as described herein to also be stored on R2 along with the mirrored data.

The I/O driver may perform such processing as described herein, to determine the additional metadata and issue the one or more additional writes (of both the write data and the additional metadata) to the mirror on R2, in a manner transparent to the issuing application.

Referring to FIG. 6, shown is an example of information that may be used by an I/O driver of the host 110a in an embodiment in accordance with techniques herein. The information in table 400 may be used in connection with an embodiment in which writes to the FBA device, R2, are performed synchronously as described elsewhere herein where the application does not receive an acknowledgement regarding completion of the original write operation to R1 until the host 110a receives acknowledgement regarding completion of the write to R1 and also completion of the one or more corresponding additional writes to the mirror on R2.

The example 400 illustrates information that may be maintained and used by the I/O driver in connection with tracking the one or more additional write operations to R2 issued to accomplish the mirroring of a single originating host write operation to R1 such as issued by an application executing on the host 110a. In at least one embodiment, each originating host write I/O for which one or more corresponding additional writes to R2 are issued may be assigned a unique identifier (ID). The table 400 may include a first column 402 denoting the originating host write I/O ID, a second column 401 denoting the status of the originating host write I/O, a third column 404 denoting the one or more additional write I/Os to R2 issued to mirror the single host write I/O, and a fourth column 406 denoting the status of the one or more additional write I/Os to R2. The table may include a set of information or entry for each of the originating write I/Os. For example, row 407a includes information for the single host write I/O having ID=A for which the I/O driver issued two I/Os, A1 and A2, to R2 to accomplish mirroring write A. In this example as denoted by 407a in column 406, the original host write A to R1 has completed, write A1 to R2 is still pending while write A2 to R2 has completed. Row 407b includes information for another single host write I/O having ID=B for which the I/O driver issued a single I/O, B1, to R2. In this example as denoted by 407a in column 406, write B to R1 is pending and write B1 to R2 has completed.

A status of pending in column 401 may denote that a corresponding write operation to R1 has not yet completed in that the I/O driver on the host has not yet received an acknowledgement from the data storage system 102 that the R1 write operation has completed. A status of complete in column 401 may denote that particular write operation to R1 has completed in that the I/O driver on the host has received an acknowledgement from the data storage system 102 that the write operation to R1 has completed.

A status of pending in column 406 may denote that a write operation to R2 has not yet completed in that the I/O driver on the host has not yet received an acknowledgement from the data storage system 102 that the R2 write operation has completed. A status of complete in column 406 may denote that particular write operation to R2 has completed in that the I/O driver on the host has received an acknowledgement from the data storage system 102 that the write operation to R2 has completed.

When performing processing using techniques herein in a synchronous manner/synchronous mirroring, once the I/O driver receives notice of completion (e.g., in column 401) of an originating host write to R1 as well as acknowledgement regarding completion (e.g. in column 406) of each of the one or more additional corresponding writes to R2 issued for the particular originating write to R1 denoted by 402, then the I/O driver may return an acknowledgement to the application or other requester that the originating write has completed. For example, for a single entry 407a, a status of completion needs to obtained in 401 for the originating host write to R1 and in 406 for each of the writes to the mirror on R2.

In connection with asynchronous mirroring, the information in table 400 may also be used as will now be described. Consider the case when performing asynchronous mirroring to R2, the FBA device, where the original application write to R1 has completed but the one or more additional corresponding writes to the mirror on R2 have not completed. An acknowledgement may be returned to the application regarding completion of the write even though the one or more additional writes to the R2 mirror are still pending or outstanding (e.g., with reference to 407a, return acknowledgement to application regarding completion of write I/O since R1 write status of complete in 401). In such a case, the application may have originally allocated and stored the write data in a private buffer where the I/O driver and other code performing techniques herein may obtain the write data through reference the address of the write data in the private buffer. Once the application receives acknowledgement regarding completion of the write operation having the write data in the private buffer, the application may reuse the allocated storage of its private buffer. However, the I/O driver or other component performing processing in accordance with techniques herein may still need to have access to a copy of the write data. Thus, in at least one embodiment in accordance with techniques herein when performing asynchronous mirroring, the I/O driver may allocate storage for storing a copy of the write data issued for the one or more additional writes to the R2 mirror.

Figure 7:
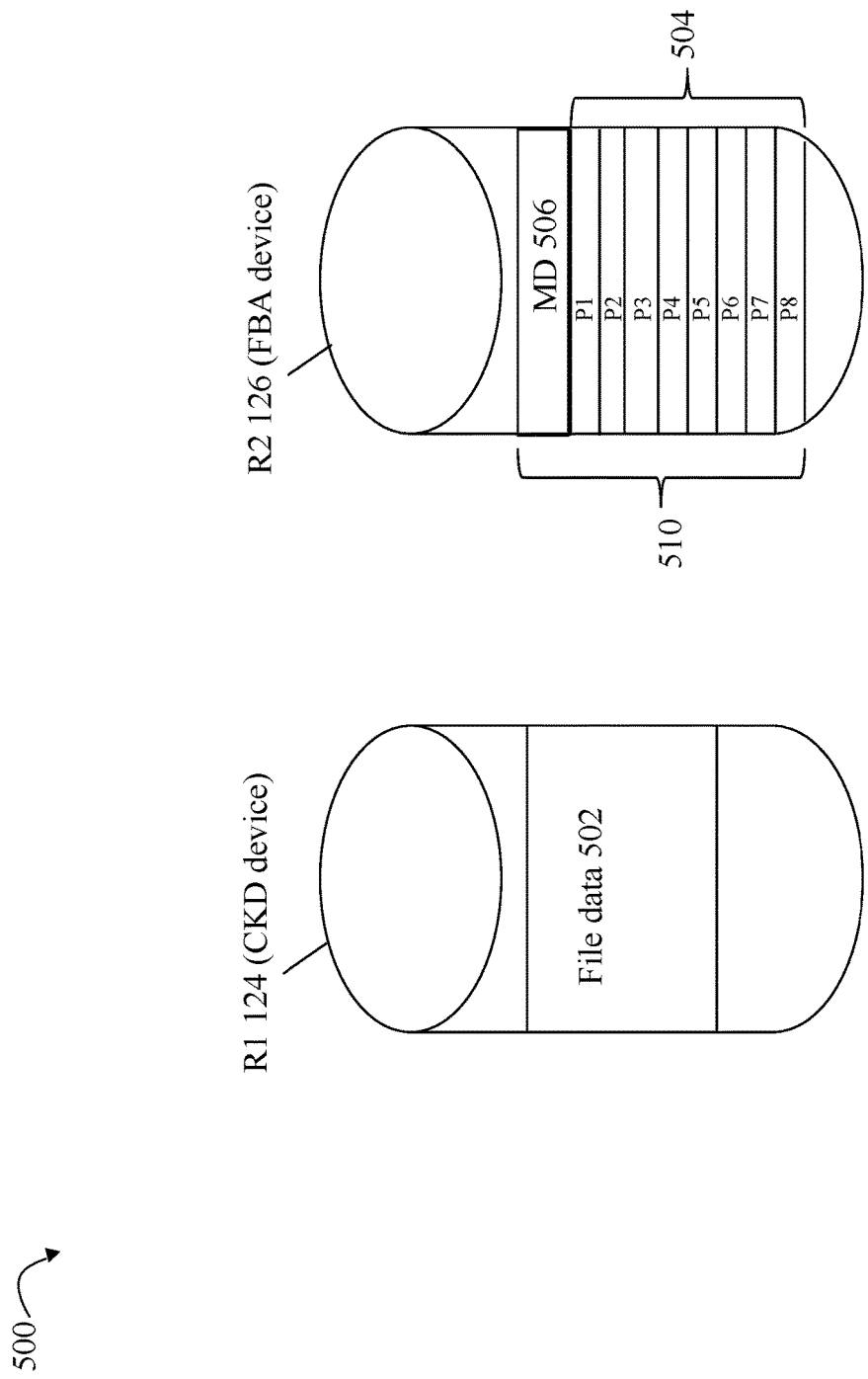
FIG. 7 is an example illustrating data stored on a first logical device R1 and mirrored on a second logical device R2 with associated additional metadata in an embodiment in accordance with techniques herein.

Referring to FIG. 7, shown is an example 500 illustrating data as may be stored on R1 124, the CKD device, and R2 126, the FBA device in an embodiment in accordance with techniques herein. The example 500 illustrates data as may be stored on R1 and also mirrored on R2 for a file or other data portion in connection with physical mirroring as described herein where the original or primary data of the CKD file is preserved or unmodified when stored on R2 126 (stored as an actual representation of the CKD file data as stored on the CKD device R1). Element 502 may denote the file as stored on the CKD device R1 124 which is mirrored on the R2 126, the FBA device. Element 510 may denote the storage allocated on R2 126 for storing the mirrored copy 504 of the file 502 along with additional metadata (MD) 506. Element 506 may denote the additional MD located at the starting offset of storage 510 allocated for storing the mirror. The MD 506 may describe the format or mapping of the mirrored CKD file data 504 so that an application such as on host 110b reading the mirrored copy of the file stored on R2 (e.g., from area 510) can understand the mapping or format of the mirrored CKD file data 504. For example, as described herein, such additional MD 506 may denote the mapping between a set of 8-512 byte blocks P1-P8 stored on 510 to a single CKD record. In this simple example, the file illustrated having its data mirrored 504 on R2 126 may be a single 4K byte CKD record as described above which is stored as 8-512 byte blocks P1-P8. However, more generally, the file or data portion mirrored may be any size. Thus, the MD 506 may denote the MD for the entire file which may include multiple CKD records and thus a set of P1-P8 for each CKD record. An embodiment may store all MD for the single file as a single MD chunk 506 as illustrated prior to the mirrored file data 504. In at least one embodiment, the MD 506 followed by mirrored CKD data 504 for a single file may generally be stored on R2 126 for each CKD file of R1 124 selected for mirroring on R2 such as when physical mirroring is performed. More generally, storing additional MD for each file mirrored on R2 126 may also be done, as needed, also in the case of logical mirroring. Thus, mirrored data which is transformed, such as in the case of logical mirroring, may be stored on R2 126 in a manner similar to that as illustrated in the example 500.

Figure 8:
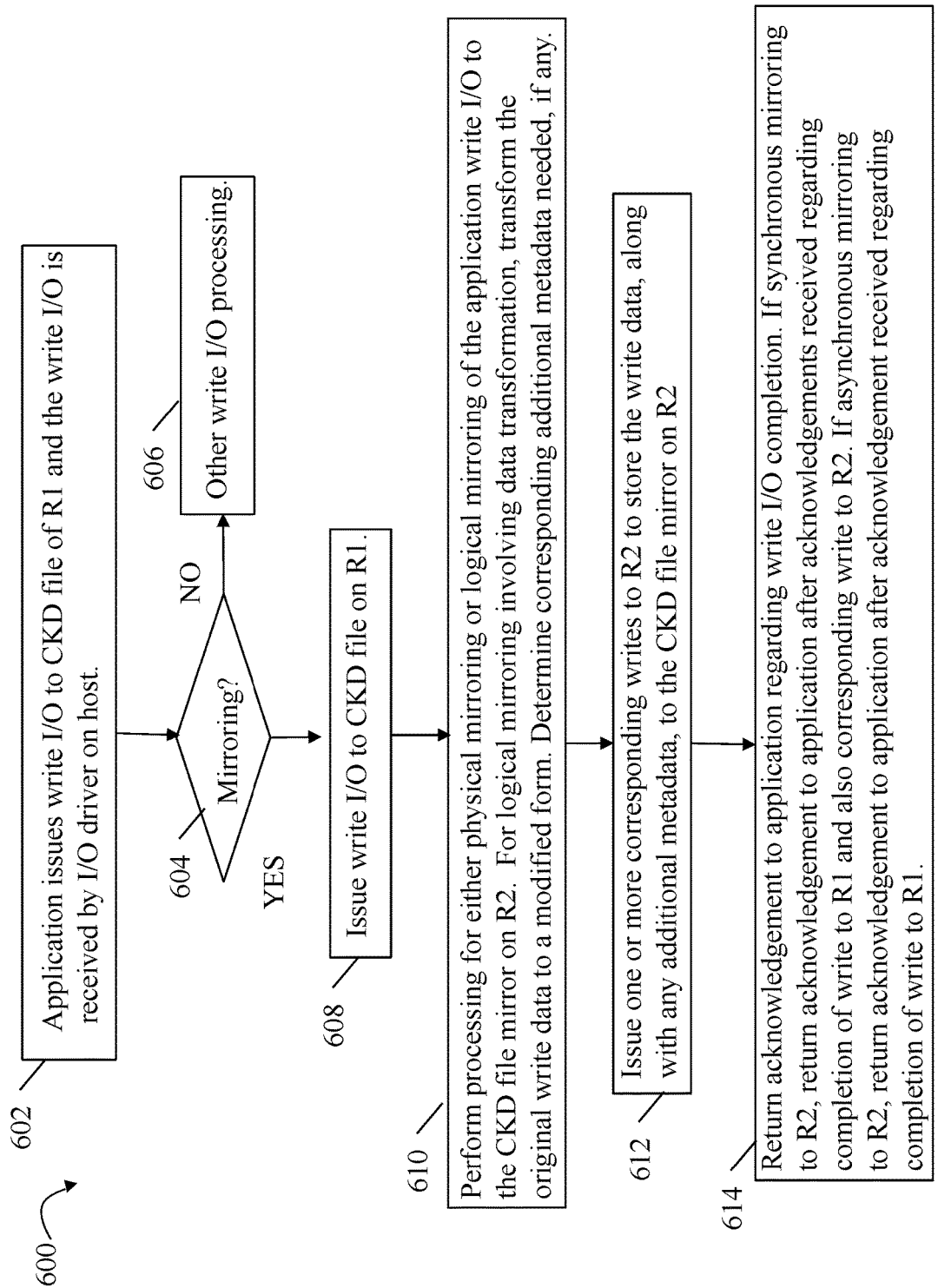

What will now be described in connection with FIG. 8 is a flowchart of processing steps that may be performed in an embodiment in accordance with techniques herein. The flowchart 600 may be performed by the host and summarized processing described above. At step 602, an application on a host, such as host 110a, issues a write I/O to write data to a CKD file of logical device R1. The write I/O is received by the I/O driver on the host. At step 604, the I/O driver on the host determines whether the write I/O is to be mirrored on the R2 logical device. In particular, the I/O driver may determine whether the write I/O is directed to a CKD file that is mirrored on the FBA device, R2. If step 604 evaluates to no, control proceeds to step 606 to perform other write I/O processing. If step 604 evaluates to yes, control proceeds to step 608. At step 608, the write I/O may be issued to the CKD file on R1. At step 610, processing is performed for either physical mirroring or logical mirroring of the application write I/O to the CKD file mirror on R2. For logical mirroring involving data transformation, the write data is transformed from its original to a modified form. Additionally, step 610 processing includes determining any corresponding additional metadata needed, if any. In step 612, the one or more corresponding writes to R2 are issued from the host to the data storage system to store the write data, along with any additional metadata, to the CKD file mirror on R2. At step 614, an acknowledgement is returned to the application regarding completion of the original application write I/O operation. If synchronous mirroring to R2 is performed, an acknowledgement is returned to the application after acknowledgements are received regarding completion of R1 write (issued in step 608) and also regarding completion of corresponding write(s) to R2 (issued in step 612). If asynchronous mirroring to R2 is performed, an acknowledgement is returned to the application after acknowledgement is received regarding completion of R1 write (issued in step 608) (e.g., without requiring completion of corresponding write(s) to R2 (issued in step 612).

An embodiment may implement the techniques herein using code executed by a processor. For example, an embodiment may implement the techniques herein using code which is executed by one or more processors. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of mirroring data comprising:
   issuing, by an application on a host, a write operation that writes first data to a primary storage entity, said primary storage entity having data stored in accordance with a first format and first structure;
   intercepting, on the host, the write operation; and
   responsive to intercepting the write operation on the host, performing first processing on the host to process the write operation received from the application on the host, the first processing comprising:
      sending the write operation from the host to a data storage system including the primary storage entity;
      determining, using mapping information, whether the primary storage entity is mirrored as a second storage entity having data stored in a second format and second structure different from the first format and first structure, wherein the mapping information identifies whether mirroring is enabled or disabled for different ranges of logical device offsets of logical devices in the data storage system which are mirrored on other logical devices;
      responsive to determining, using the mapping information, that the primary storage entity is mirrored as the second storage entity, issuing one or more second write operations to mirror the first data on the second storage entity in accordance with the second format and second structure; and
      responsive to determining, using the mapping information, that the primary storage entity is not mirrored as the second storage entity, not issuing any write operation to mirror the first data on the second storage entity.

2. The method of claim 1, where the first processing includes processing the first data to store the first data on the second storage entity in accordance with the second format and second structure without modifying the first data.

3. The method of claim 2, wherein the first processing includes:
   partitioning the first data into multiple portions; and
   determining first metadata describing a representation of the first data as the multiple portions, wherein the one or more second write operations write the first metadata and the multiple portions to the second storage entity.

4. The method of claim 1, wherein the first processing includes:
   transforming the first data to second data in accordance with the second format and second structure, wherein the second data includes a modified form of the first data, wherein the one or more second write operations write the second data to the second storage entity and also writes any second metadata, to the second storage entity, wherein the second metadata describes the second data in accordance with the second format and second structure.

5. The method of claim 4, wherein said transforming includes performing any one or more of: removing at least some of the first data, replacing a first portion of the first data with different data, adding additional data to the first data.

6. The method of claim 1, wherein the primary storage entity and second storage entity are in a same data storage system.

7. The method of claim 1, where the first processing is performed by an I/O driver on the host.

8. The method of claim 1, further comprising:
   performing processing that initially synchronizes the primary storage entity and the second storage entity prior to processing the write operation.

9. The method of claim 1, wherein the primary storage entity is a first file on a first logical device, and the second storage entity is a second file on a second logical device, wherein data is stored on the first logical device in accordance with the first format and the first structure and data is stored on the second logical device in accordance with the second format and the second structure.

10. The method of claim 1, wherein the primary storage entity is a first logical device and the second storage entity is a second logical device, wherein data is stored on the first logical device in accordance with the first format and the first structure and data is stored on the second logical device in accordance with the second format and the second structure.

11. The method of claim 1, wherein the primary storage entity is a portion of a first device and the second storage entity is a portion of a second device.

12. The method of claim 1, wherein the first processing writes the first data to the primary storage entity and mirrors the first data on the second storage entity in a synchronous manner whereby an acknowledgement regarding completion of the write operation is returned to the application when the host receives acknowledgement that the first data has been written to the first storage entity and also received acknowledgement that the first data has been mirrored to the second storage entity.

13. The method of claim 1, wherein the first processing writes the first data to the primary storage entity and mirrors the first data on the second storage entity in an asynchronous manner whereby an acknowledgement regarding completion of the write operation is returned to the application when the host receives acknowledgement that the first data has been written to the first storage entity without further requiring acknowledgement that the first data has been mirrored to the second storage entity.

14. A system comprising:
   at least one processor; and
   a memory comprising code stored thereon that, when executed, performs a method of mirroring data comprising:
      issuing, by an application on a host, a write operation that writes first data to a primary storage entity, said primary storage entity having data stored in accordance with a first format and first structure;
      intercepting, on the host, the write operation; and
      responsive to intercepting the write operation on the host, performing first processing on the host to process the write operation received from the application on the host, the first processing comprising:
         sending the write operation from the host to a data storage system including the primary storage entity;
         determining, using mapping information, whether the primary storage entity is mirrored as a second storage entity having data stored in a second format and second structure different from the first format and first structure, wherein the mapping information identifies whether mirroring is enabled or disabled for different ranges of logical device offsets of logical devices in the data storage system which are mirrored on other logical devices;
         responsive to determining, using the mapping information, that the primary storage entity is mirrored as the second storage entity, issuing one or more second write operations to mirror the first data on the second storage entity in accordance with the second format and second structure; and
         responsive to determining, using the mapping information, that the primary storage entity is not mirrored as the second storage entity, not issuing any write operation to mirror the first data on the second storage entity.

15. A non-transitory computer readable medium comprising code stored thereon that, when executed, performs a method of mirroring data comprising:
   issuing, by an application on a host, a write operation that writes first data to a primary storage entity, said primary storage entity having data stored in accordance with a first format and first structure;
   intercepting, on the host, the write operation; and
   responsive to intercepting the write operation on the host, performing first processing on the host to process the write operation received from the application on the host, the first processing comprising:
      sending the write operation from the host to a data storage system including the primary storage entity;
      determining, using mapping information, whether the primary storage entity is mirrored as a second storage entity having data stored in a second format and second structure different from the first format and first structure, wherein the mapping information identifies whether mirroring is enabled or disabled for different ranges of logical device offsets of logical devices in the data storage system which are mirrored on other logical devices;
      responsive to determining, using the mapping information, that the primary storage entity is mirrored as the second storage entity, issuing one or more second write operations to mirror the first data on the second storage entity in accordance with the second format and second structure; and responsive to determining, using the mapping information, that the primary storage entity is not mirrored as the second storage entity, not issuing any write operation to mirror the first data on the second storage entity.

16. The non-transitory computer readable medium of claim 15, where the first processing includes processing the first data to store the first data on the second storage entity in accordance with the second format and second structure without modifying the first data.

17. The non-transitory computer readable medium of claim 16, wherein the first processing includes:
partitioning the first data into multiple portions; and
determining first metadata describing a representation of the first data as the multiple portions, wherein the one or more second write operations write the first metadata and the multiple portions to the second storage entity.

18. The non-transitory computer readable medium of claim 15, wherein the first processing includes:
transforming the first data to second data in accordance with the second format and second structure, wherein the second data includes a modified form of the first data, wherein the one or more second write operations write the second data to the second storage entity and also writes any second metadata, to the second storage entity, wherein the second metadata describes the second data in accordance with the second format and second structure.

19. The non-transitory computer readable medium of claim 18, wherein said transforming includes performing any one or more of: removing at least some of the first data, replacing a first portion of the first data with different data, adding additional data to the first data.

20. The non-transitory computer readable medium of claim 15, where the first processing is performed by an I/O driver on the host.

* * * * *